US009908557B2

(12) United States Patent
Yamada et al.

(10) Patent No.: US 9,908,557 B2
(45) Date of Patent: Mar. 6, 2018

(54) STEERING CONTROL DEVICE, STEERING CONTROL SYSTEM, STEERING CONTROL METHOD, AND COMPUTER READABLE MEDIUM STORING STEERING CONTROL PROGRAM

(71) Applicant: Mitsubishi Electric Corporation, Tokyo (JP)

(72) Inventors: Hiroyuki Yamada, Tokyo (JP); Michinori Yoshida, Tokyo (JP); Akira Hirata, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/310,390

(22) PCT Filed: Jul. 7, 2014

(86) PCT No.: PCT/JP2014/003591
§ 371 (c)(1),
(2) Date: Nov. 10, 2016

(87) PCT Pub. No.: WO2016/006013
PCT Pub. Date: Jan. 14, 2016

(65) Prior Publication Data
US 2017/0174258 A1 Jun. 22, 2017

(51) Int. Cl.
*A01B 69/00* (2006.01)
*B62D 6/00* (2006.01)
(Continued)

(52) U.S. Cl.
CPC ............ *B62D 6/002* (2013.01); *B62D 5/0457* (2013.01); *B62D 6/02* (2013.01); *B62D 6/08* (2013.01); *B62D 15/025* (2013.01)

(58) Field of Classification Search
CPC .......................... G06Q 30/0625; G01C 21/206
See application file for complete search history.

(56) References Cited

U.S. PATENT DOCUMENTS

| 5,906,645 A | 5/1999 | Kagawa et al. |
| 6,205,374 B1 | 3/2001 | Kljima et al. |

(Continued)

FOREIGN PATENT DOCUMENTS

| JP | 6-297983 A | 10/1994 |
| JP | 9-222922 A | 8/1997 |

(Continued)

*Primary Examiner* — Adam Alharbi
(74) *Attorney, Agent, or Firm* — Birch, Stewart, Kolasch & Birch, LLP

(57) ABSTRACT

According to the present invention, a steering control device having a manual steering mode in which a travelling direction of a vehicle is controlled in correspondence with a steering wheel state quantity indicating an operation quantity of a steering wheel provided at a vehicle and a compulsory automatic steering mode in which the travelling direction is controlled automatically, and controlling a steering wheel control quantity to be added to the steering wheel in accordance with the manual steering mode or the compulsory automatic steering mode, the steering control device is characterized by being provided with: steering mode selection means to switch between the manual steering mode and the compulsory automatic steering mode; and steering wheel control quantity calculation means, in a case where the manual steering mode is selected by the steering mode selection means, to calculate the steering wheel control quantity to be added to the steering wheel based on information indicating travelling state, and in a case where the compulsory automatic steering mode is selected by the steering mode selection means, to calculate the steering wheel control quantity having a magnitude different from the steering wheel control quantity calculated in the manual (Continued)

steering mode based on the information indicating the travelling state.

13 Claims, 8 Drawing Sheets

(51) Int. Cl.
    *B62D 15/02*     (2006.01)
    *B62D 5/04*     (2006.01)
    *B62D 6/02*     (2006.01)
    *B62D 6/08*     (2006.01)

(56) References Cited

U.S. PATENT DOCUMENTS

| | | | |
|---|---|---|---|
| 6,230,084 B1 | 5/2001 | Kijima et al. | |
| 6,871,717 B2 | 3/2005 | Kada | |
| 6,907,333 B2 | 6/2005 | Iwazaki | |
| 7,604,087 B2 | 10/2009 | Senda et al. | |
| 8,688,327 B2 | 4/2014 | Limpibunterng et al. | |
| 9,393,960 B2 * | 7/2016 | Kodaira | B60W 30/12 |
| 2003/0050748 A1 | 3/2003 | Iwazaki | |
| 2004/0055801 A1 | 3/2004 | Kada | |
| 2007/0144823 A1 | 6/2007 | Senda et al. | |
| 2012/0123643 A1 | 5/2012 | Limpibuntering et al. | |
| 2014/0142797 A1 * | 5/2014 | Otake | B60W 20/00 701/22 |

FOREIGN PATENT DOCUMENTS

| | | |
|---|---|---|
| JP | 9-240502 A | 9/1997 |
| JP | 10-194150 A | 7/1998 |
| JP | 10-309961 A | 11/1998 |
| JP | 11-78944 A | 3/1999 |
| JP | 11-78953 A | 3/1999 |
| JP | 2000/159136 A | 6/2000 |
| JP | 2001-122145 A | 5/2001 |
| JP | 2003-154947 A | 5/2003 |
| JP | 2003-320868 A | 11/2003 |
| JP | 2004-30361 A | 1/2004 |
| JP | 2004-34751 A | 2/2004 |
| JP | 2004-256076 A | 9/2004 |
| JP | 2007-145248 A | 6/2007 |
| JP | 2009-51492 A | 3/2009 |
| JP | 2009-208551 A | 9/2009 |
| JP | 2010-132100 A | 6/2010 |
| JP | 2010-149612 A | 7/2010 |
| JP | 2011-31769 A | 2/2011 |
| JP | 2012-232676 A | 11/2012 |

* cited by examiner

STEERING CONTROL DEVICE, STEERING CONTROL SYSTEM, STEERING CONTROL METHOD, AND COMPUTER READABLE MEDIUM STORING STEERING CONTROL PROGRAM

TECHNICAL FIELD

The present invention relates to, in steer-by-wire technology, a steering control device, a steering control system, a steering control method, and a steering control program, each of which controls a steering wheel.

BACKGROUND ART

Currently, steer-by-wire technology (SBW: Steer-By-Wire) in which a steering wheel and wheels are mechanically separated has been developed. In the steer-by-wire, the steering wheel and the wheels are not mechanically connected, a motor is driven by electric signals in correspondence with a steering wheel operation of a driver and the direction of the wheels is controlled. The steer-by-wire enables to keep the wheels at an angle indicated by the driver without losing steering control on a rough road surface and the like. However, since the steering wheel and the wheels are not mechanically connected, the force from the ground surface according to a speed of a car and an angle of the wheels is not transferred to the steering wheel, and sense of incongruity occurs to the driver, which degrades the operationability. To improve this, there is a technique to add pseudo force to the steering wheel based on information of travelling state of the car such as a speed and the like (Patent Literature 1).

CITATION LIST

Patent Literature

Patent Literature 1 JP2012-232676A

SUMMARY OF INVENTION

Technical Problem

On the other hand, in recent years, Autonomous Emergency Steering System has been developed. Autonomous Emergency Steering System is a system to automatically control, for instance, in a case where an obstacle suddenly appears in front of a car, the travelling direction of the car in order to avoid collision. In this manner, in a case where the travelling direction of the car is automatically controlled, a mode by which the travelling direction of the car is controlled regardless of the steering of the driver is referred to as a compulsory automatic steering mode. The compulsory automatic steering mode is not applied by the operation of the driver, but applied compulsorily.

In a car to which the steer-by-wire technology is applied like a steering control device disclosed in Patent Literature 1, the steering wheel and the wheels are not mechanically connected, but a pseud force is transferred to the steering wheel, and thus the driver cannot recognize the transfer to the compulsory automatic steering mode if the force is added to the steering wheel similarly to a case where a mode in which the travelling direction of the car is manually controlled (a manual steering mode, hereinafter) is applied.

The present invention is provided in consideration of the above problems and aims to convey to the driver, via the steering wheel, that the compulsory automatic steering mode is applied.

Solution to Problem

According to the invention, a steering control device having a manual steering mode in which a travelling direction of a vehicle is controlled in correspondence with a steering wheel state quantity indicating an operation quantity of a steering wheel provided at a vehicle and a compulsory automatic steering mode in which the travelling direction is controlled automatically, the steering control device controlling a steering wheel control quantity to be added to the steering wheel in accordance with the manual steering mode or the compulsory automatic steering mode, the steering control device includes: steering mode selection means to switch between the manual steering mode and the compulsory automatic steering mode; and steering wheel control quantity calculation means, in a case where the manual steering mode is selected by the steering mode selection means, to calculate the steering wheel control quantity to be added to the steering wheel based on information indicating travelling state of the vehicle, and in a case where the compulsory automatic steering mode is selected by the steering mode selection means, to calculate the steering wheel control quantity having a magnitude different from the steering wheel control quantity calculated in the manual steering mode based on the information indicating the travelling state.

According to the invention, a steering control system having: a steering wheel provided at a vehicle; steering control means having a manual steering mode in which a travelling direction of the vehicle is controlled in correspondence with a steering wheel state quantity indicating an operation quantity of the steering wheel and a compulsory automatic steering mode in which the travelling direction is controlled automatically, to calculate a steering wheel control quantity to be added to the steering wheel according to the manual steering mode or the compulsory automatic steering mode; and steering wheel control quantity addition means to add the steering wheel control quantity to the steering wheel based on the steering wheel control quantity calculated by the steering control means, the steering control means includes: steering mode selection means to switch between the manual steering mode and the compulsory automatic steering mode; steering wheel control quantity calculation means, in a case where the manual steering mode is selected by the steering mode selection means, to calculate the steering wheel control quantity to be added to the steering wheel based on information indicating travelling state of the vehicle, in a case where the compulsory automatic steering mode is selected by the steering mode selection means, to calculate the steering wheel control quantity having a magnitude different from the steering wheel control quantity calculated in the manual steering mode based on the information indicating the travelling state.

According to the invention, a steering control method includes: a steering mode selection step to select a manual steering mode in which a travelling direction of a vehicle is controlled in correspondence with a steering wheel state quantity indicating an operation quantity of a steering wheel provided at a vehicle and a compulsory automatic steering mode in which the travelling direction is controlled automatically, a steering wheel control quantity calculating step, in a case where the manual steering mode is selected by the steering mode selection means, to calculate a steering wheel control quantity to be added to the steering wheel based on information indicating travelling state, in a case where the compulsory automatic steering mode is selected by the steering mode selection means, to calculate, the steering wheel control quantity having a magnitude different from the steering wheel control quantity calculated in the manual steering mode based on the information indicating the travelling state; and a steering wheel control quantity adding step to control steering wheel control quantity addition means to add the steering wheel control quantity to the steering wheel based on the steering wheel control quantity calculated by the steering wheel control quantity calculating step.

According to the invention, a steering control program causes a computer to execute: a steering mode selection step to select a manual steering mode in which a travelling direction of a vehicle is controlled in correspondence with a steering wheel state quantity indicating an operation quantity of a steering wheel provided at a vehicle and a compulsory automatic steering mode in which the travelling direction is controlled automatically, a steering wheel control quantity calculating step, in a case where the manual steering mode is selected by the steering mode selection means, to calculate a steering wheel control quantity to be added to the steering wheel based on information indicating travelling state, in a case where the compulsory automatic steering mode is selected by the steering mode selection means, to calculate, the steering wheel control quantity having a magnitude different from the steering wheel control quantity calculated in the manual steering mode based on the information indicating the travelling state; and a steering wheel control quantity adding step to control steering wheel control quantity addition means to add the steering wheel control quantity to the steering wheel based on the steering wheel control quantity calculated by the steering wheel control quantity calculating step.

Advantageous Effects of Invention

According to the present invention, in a case where, during a vehicle is running, a mode is switched to the compulsory automatic steering mode, the steering wheel control quantity having a magnitude different from the steering wheel control quantity added in the manual steering mode is added to the steering wheel, and thereby the driver is made, via the steering wheel, recognize that the mode is switched to the compulsory automatic steering mode.

DESCRIPTION OF EMBODIMENTS

Embodiment 1.

Figure 1:
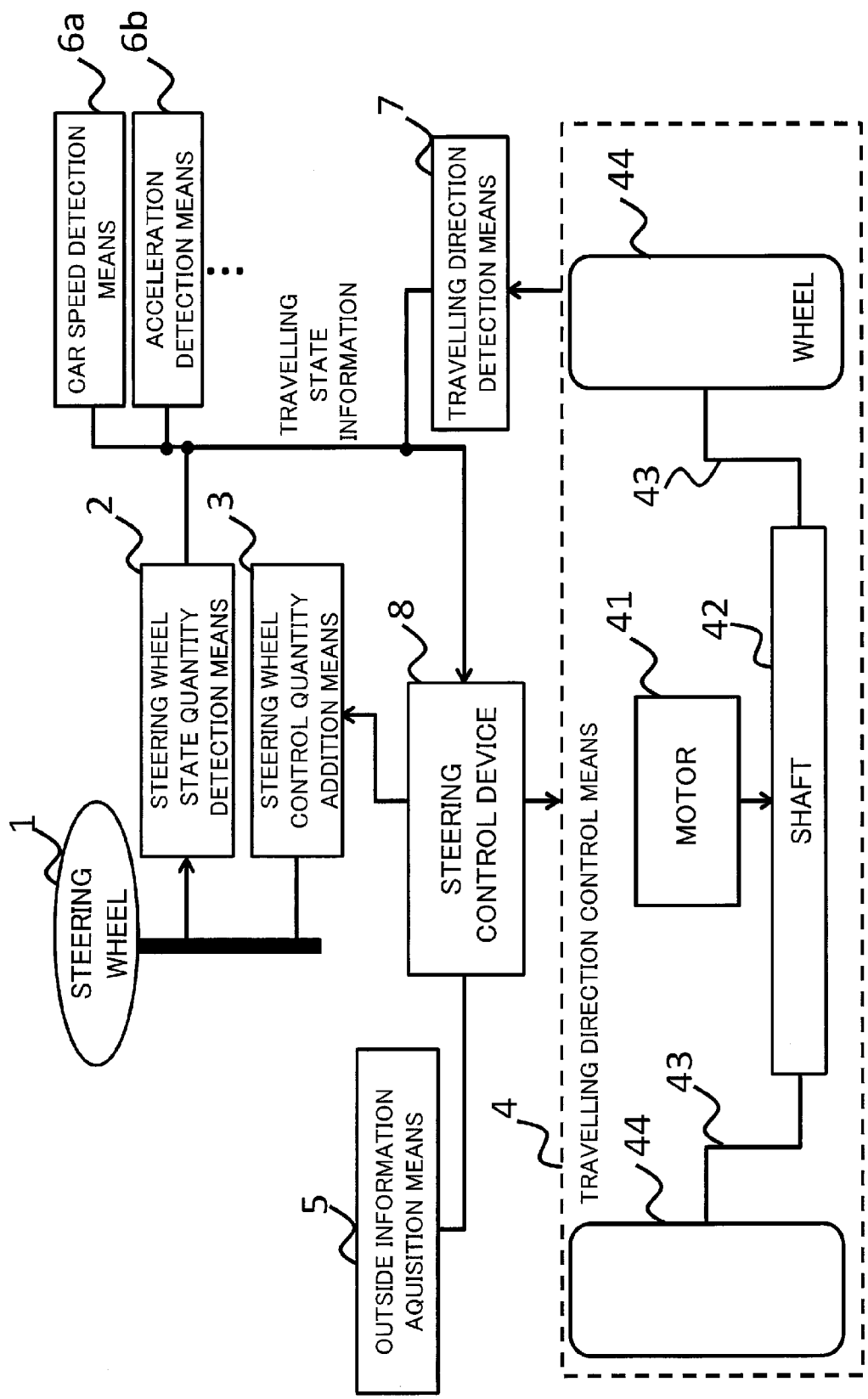
FIG. 1 is a configuration diagram of a steering control system related to a first embodiment.

Hereinafter, with reference to FIGS. 1 to 6, a steering control system related to a first embodiment will be explained. FIG. 1 is a configuration diagram of a steering control system related to the first embodiment. The steering control system related to the first embodiment is configured by a steering wheel 1, steering wheel state quantity detection means 2, steering wheel control quantity addition means 3, travelling direction control means 4, outside information acquisition means 5, car speed detection means 6a, acceleration detection means 6b, travelling direction detection means 7, and a steering control device 8 (steering control means 8).

Figure 2:
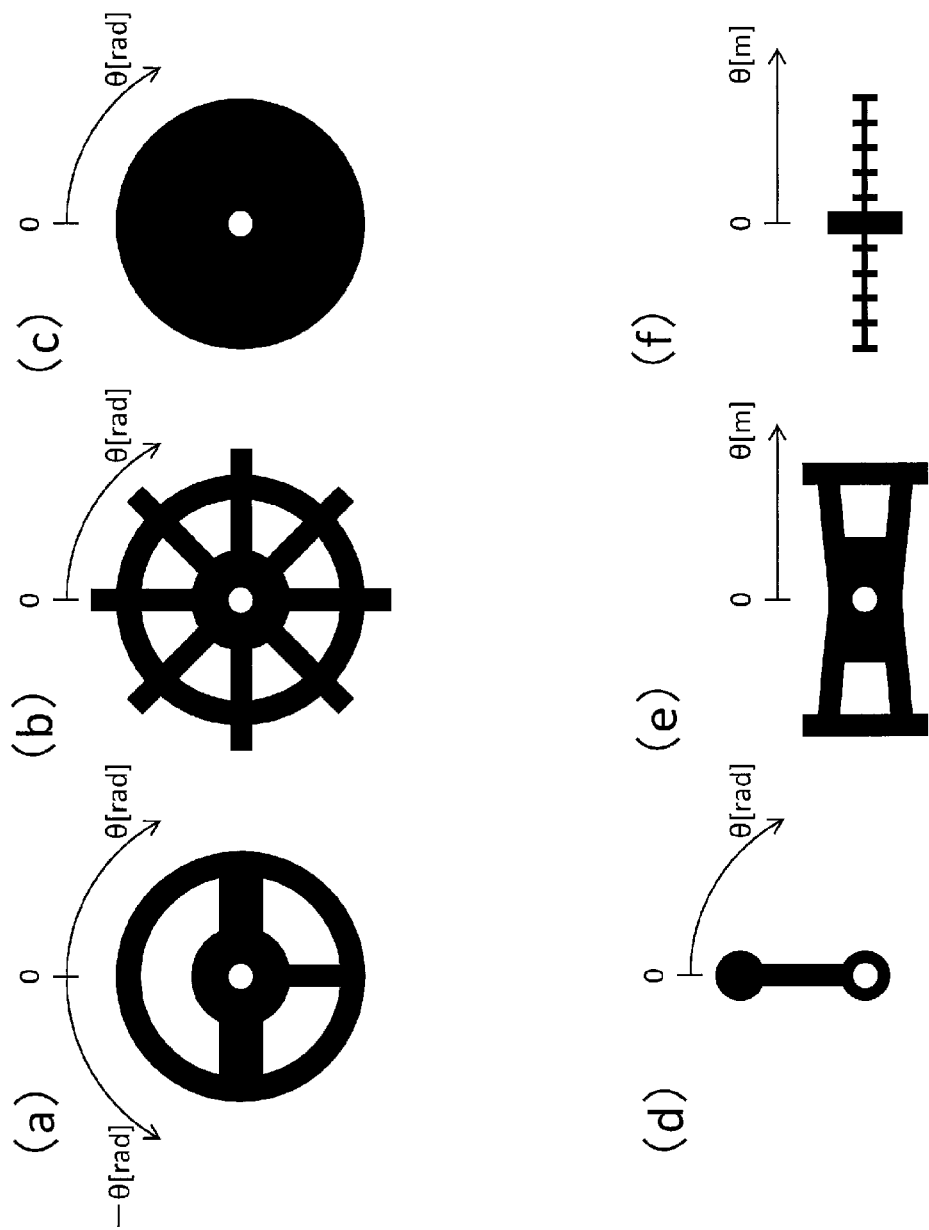
FIG. 2 illustrates examples of a steering wheel used for the steering control system related to the first embodiment.

The steering wheel 1 is an interface to input a travelling direction, and is able to control the travelling direction control means 4, which will be discussed later, by operation of a driver. Note that the steering wheel 1 is not limited to a steering wheel of an automobile. FIG. 2 illustrates examples of a steering wheel used for the steering control system related to the first embodiment. The steering wheel 1 may be a wheel for steering of a general automobile as illustrated as (a) in FIG. 2, and may be a rudder of a ship as illustrated as (b) in FIG. 2, and further may be in a shape illustrated in the drawing of (c). In addition, the steering wheel 1 is not limited to the above, but may be a lever shape or a knob shape as illustrated as (d) to (f) in FIG. 2. That is, the steering wheel 1 may be a substance which can express the travelling direction which the driver desires by operation quantity such as rotation quantity or movement quantity; a form or design is not limited to those illustrated in FIG. 2. In the following explanation, a car will be explained as an example; however, the steering control system related to the present invention can be applied to a vehicle which controls the travelling direction such as a ship, an airplane, and the like.

The steering wheel state quantity detection means 2 is means to detect steering wheel state quantity of the steering wheel 1 operated by the driver. The steering wheel state quantity is information indicating operation quantity of the steering wheel 1. For instance, in a case where the steering control system related to the present embodiment is mounted on an automobile, the steering wheel state quantity is expressed by information $\theta[rad]$ assuming that the steering wheel state indicating going straight ahead (neutral position) is 0 and clockwise rotation is positive as illustrated as (a) in FIG. 2. Note that in case of the steering wheels like drawings of (e) and (f), the steering wheel state quantity is expressed by a distance $\theta[m]$ of movement from the neutral position to the right direction.

The steering wheel control quantity addition means 3 is means to add steering wheel control quantity to the steering wheel 1 according to a signal from the steering control device 8, which will be discussed later. The steering wheel control quantity is a force or a torque to be added to control the steering wheel. As for the steering wheel control quantity addition means 3, friction means (not illustrated) and the like which generates friction by interposing, for instance, a motor or a shaft (not illustrated) connected to the steering wheel 1 to generate the steering wheel control quantity correspond to that. The steering wheel control quantity expressed by the signal from the steering control device 8 is defined as a force or a torque to be added to control the steering wheel; in case of the friction means (not illustrated), it is expressed by a positive value, and in case of the motor, it is expressed by a positive or negative torque according to the rotation direction. In case of the rotary steering wheel as illustrated as (a) to (d) in FIG. 2, assuming that a vector directing to the direction which moves away from the driver is an axis and the steering wheel control quantity to rotate clockwise is positive, and a vector directing to the direction which moves away from the driver is an axis and the steering wheel control quantity to rotate counterclockwise is negative. In case of the steering wheel sliding horizontally as illustrated as (e) and (f) in FIG. 2, the steering wheel control quantity to add to the right from the driver side can be expressed as positive, and the steering wheel control quantity to add to the left from the driver side can be expressed as negative. The steering wheel control quantity addition means 3 adds the steering wheel control quantity to the steering wheel 1 based on the information of the steering wheel control quantity discussed above. Note that the steering wheel control quantity can be defined in any way as long as it is able to identify the steering wheel control quantity to be added to the steering wheel 1 by the steering wheel control quantity addition means 3.

The travelling direction control means 4 is means to control a travelling direction of the car. In addition, the travelling direction control means 4 is configured by a motor 41, a shaft 42, an arm 43, and wheels 44. The motor 41 is driven based on a signal from the steering control device 8 and drives the shaft 42 in an axial direction of the shaft 42. In addition, the wheels 44 are connected to the shaft 42 via the arm 43, and they change the direction from side to side due to displacement of the shaft 42.

Outside information acquisition means 5 is means to detect a distance to an object surrounding the car, the road state and the like as outside information. For instance, as for the outside information, information of a distance to the surrounding object by Radio Detecting and Ranging (or Radar), Light Detection and Ranging (or LIDAR), Sound Navigation and Ranging (or SONAR), and the like and image information by imaging means such as cameras correspond to that. Note that the outside information acquisition means 5 may use plural pieces of the above devices.

The car speed detection means 6a is means to measure ground speed of the car. For instance, a rotation number sensor and the like, which is used for measuring a speed of a speed meter, corresponds to such means.

The acceleration detection means 6b is a sensor to detect the acceleration of the car in the longitudinal direction and the vertical direction.

The travelling direction detection means 7 is means to detect the travelling direction quantity of the car controlled by the travelling direction control means 4. Here, the travelling direction quantity is information indicating variation of the travelling direction controlled by the travelling direction control means 4. For instance, the travelling direction quantity is the rotation quantity in the direction of the front wheel assuming that the state of the front wheel when the automobile goes straight ahead is 0 and the clockwise turning is positive.

Figure 3:
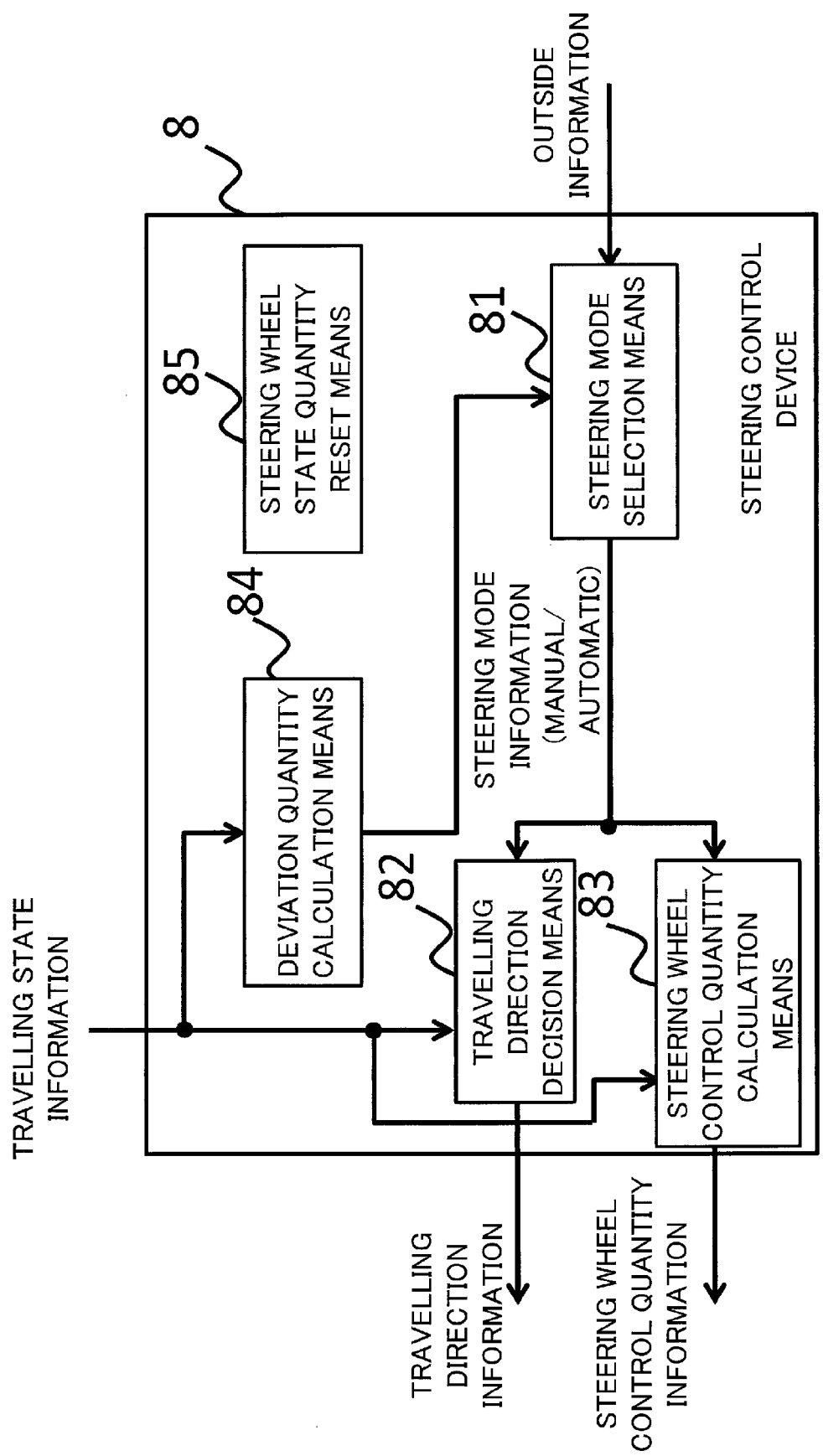
FIG. 3 is a configuration diagram of a steering control device related to the first embodiment.

The steering control device 8 controls the travelling direction control means 4 based on the steering wheel state quantity acquired from the steering wheel state quantity detection means 2 and changes the travelling direction of the car. In addition, the steering control device 8 controls the steering wheel control quantity addition means 3 based on information such as the speed, the acceleration, the travelling direction quantity, the steering wheel state quantity, and the like of the car, and adds the steering wheel control quantity to the steering wheel 1. Note that, in the following explanation, the information including at least one of the speed, the acceleration, the travelling direction quantity, and the steering wheel state quantity of the car is defined as travelling state information. Hereinafter, with reference to FIG. 3, a configuration of the steering control device 8 will be discussed in detail. FIG. 3 is a configuration diagram of the steering control device related to the first embodiment. Note that the steering control device 8 is able to acquire information from each means using the telecommunication by a copper wire, the optical communication by an optical fiber, the radio communication by an antenna, and the like; however, it is also possible to acquire information using means to measure a rotation quantity and a transition quantity of components by mechanically connecting through gears and the like.

The steering control device 8 is provided with steering mode selection means 81, travelling direction decision means 82, steering wheel control quantity calculation means 83, deviation quantity calculation means 84, and steering wheel state quantity reset means 85. Note that functions of the steering mode selection means 81, the travelling direction decision means 82, the steering wheel control quantity calculation means 83, the deviation quantity calculation means 84, and the steering wheel state quantity reset means 85 illustrated in FIG. 3 may be implemented by hardware, and also implemented by executing predetermined programs with a computer.

The steering mode selection means 81 is means to switch between a manual steering mode and a compulsory automatic steering mode. The manual steering mode is a mode in which the travelling direction control means 4 is controlled in correspondence with the operation of the steering wheel 1 by the driver. In addition, the compulsory automatic steering mode is a mode in which the travelling direction control means 4 is controlled automatically regardless of the operation of the steering wheel 1 by the driver. Determination of switching between the manual steering mode and the compulsory automatic steering mode can be considered in various forms. As for an example of determination of switching, the steering mode selection means 81, while the car is running, receives the outside information indicating a distance to the surrounding obstacle from the outside information acquisition means 5, and when it is determined that the obstacle exists within the distance with which the obstacle cannot be avoided by the current car speed and the travelling direction quantity, the steering mode selection means 81 switches from the manual steering mode to the compulsory automatic steering mode. In addition, the determination of switching from the compulsory automatic steering mode to the manual steering mode is made, for instance, when the steering wheel state quantity is determined to correspond to the travelling direction quantity by the deviation quantity calculation means 84, which will be discussed later, the compulsory automatic steering mode is switched to the manual steering mode. The steering mode selection means 81 outputs, in case of switching the steering mode, the steering mode information indicating the manual steering mode or the compulsory automatic steering mode to the travelling direction decision means 82 and the steering wheel control quantity calculation means 83, which will be discussed later. According to the selection by the steering mode selection means 81 between the manual steering mode and the compulsory automatic steering mode, the operation of the travelling direction decision means 82 and the steering wheel control quantity calculation means 83, which will be discussed later, will be changed.

Figure 4:
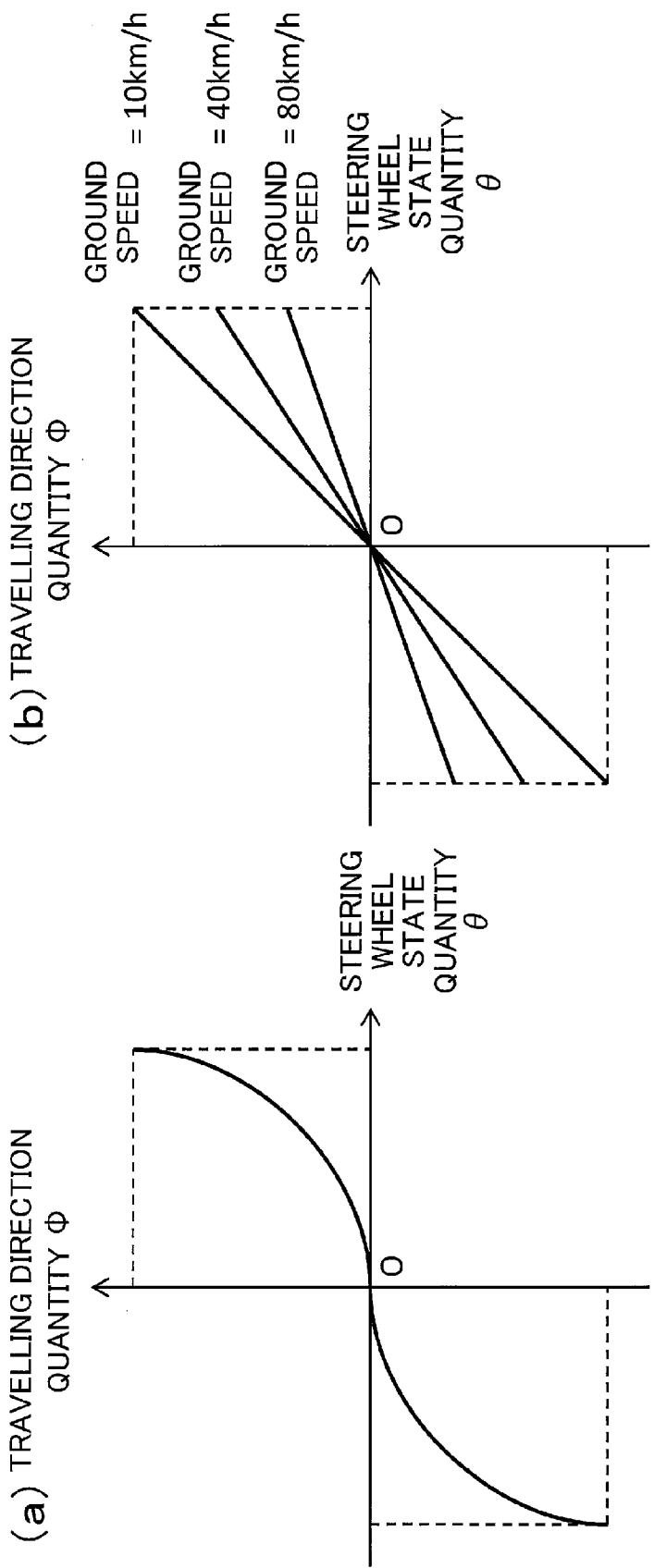
FIG. 4 illustrates examples of correspondence relation between travelling direction quantity and steering wheel state quantity in a manual steering mode related to the first embodiment.

The travelling direction decision means 82 acquires, in the manual steering mode, the steering wheel state quantity from the steering wheel state quantity detection means 2, and controls the travelling direction control means 4 so that the car goes in the corresponding travelling direction. Specifically, in the travelling direction decision means 82, the correspondence relation between the travelling direction quantity and the steering wheel state quantity is programmed; the travelling direction decision means 82 acquires information of the steering wheel state quantity from the steering wheel state quantity detection means 2, thereby deciding the travelling direction quantity of the travelling direction control means 4. Therefore, the driver can decide the travelling direction by operating the steering wheel 1 to change the steering wheel state quantity. FIG. 4 illustrates examples of correspondence relation between the travelling direction quantity and the steering wheel state quantity in the manual steering mode related to the first embodiment. (a) of FIG. 4 is an example of the correspondence relation between the steering wheel state quantity and the travelling direction quantity. Assuming that the steering wheel state quantity is $\theta$, and the travelling direction quantity is $\phi$, the relations of $\theta = f_1(\phi)$ and $\phi = f_1^{-1}(\theta)$ are established. (b) of FIG. 4 is an example of the correspondence relation between the steering wheel state quantity and the travelling direction quantity when it is decided depending on another parameter (here, the ground speed acquired from the car speed detection means 6a); assuming that the steering wheel state quantity is $\theta$, the travelling direction quantity is $\phi$, and the ground speed is v, the relations of $\theta = f_2(\phi, v)$ and $\phi = f_3(\theta, v)$ are established. Here, $f_1()$, $f_2()$ and $f_3()$ express functions, and $^{-1}$ expresses an inverse function. That is, the travelling direction decision means 82 can decide the travelling direction quantity $\phi$ by acquiring the steering wheel state quantity $\theta$ from the steering wheel state quantity detection means 2. Note that, on the contrary, it is also possible to acquire the corresponding steering wheel state quantity $\theta$ by acquiring the travelling direction quantity $\phi$ from the travelling direction detection means 7. In the present embodiment, the travelling direction decision means 82 may use n parameters which depend on the correspondence relation between the steering wheel state quantity $\theta$ and the travelling direction quantity $\phi$. Assuming that n parameters are $\rho_1, \rho_2, \ldots, \rho_n$, the relations of $\theta = F_1(\phi, \rho_1, \rho_2, \ldots \rho_n)$ and $\phi = F_2(\theta, \rho_1, \rho_2, \ldots \rho_n)$ are established. Here, $F_1()$ indicates a function to calculate the steering wheel state quantity from the travelling direction quantity, and $F_2()$ indicates a function to calculate the travelling direction quantity from the steering wheel state quantity. For instance, travelling state information, such as the acceleration of the car in the longitudinal direction and the acceleration of the car in the vertical direction which are detected by the acceleration detection means 6b, the steering wheel state quantity acquired from the steering wheel state quantity detection means 2, and the like, corresponds to each parameter.

On the other hand, the travelling direction decision means 82, in the compulsory automatic steering mode, controls the travelling direction control means 4 based on the travelling state information such as the outside information acquired from the outside information acquisition means 5, the car speed detected by the car speed detection means 6a, the travelling direction quantity acquired from the travelling direction control means 4, and the like. That is, while the car is running, the travelling direction control means 4 is automatically controlled so as to avoid collision by grasping the distances to the surrounding obstacles.

The steering wheel control quantity calculation means 83, in the manual steering mode and the compulsory automatic steering mode, decides the steering wheel control quantity to be added to the steering wheel 1 based on the travelling state information. In the manual steering mode, there are various methods for the steering wheel control quantity calculation method of the steering wheel control quantity calculation means 83; as for one example, the steering wheel control quantity calculation means 83 acquires the information related to the steering wheel state quantity from the steering wheel state quantity detection means 2 and the car speed from the car speed detection means 6a as the travelling state information, and decides the steering wheel control quantity to be added to the steering wheel 1 based on a predetermined correspondence relation. As for the relation among the steering wheel state quantity, the car speed and the steering wheel control quantity, for instance, it is defined that the larger the steering wheel state quantity is and the smaller the car speed is, the larger the steering wheel control quantity becomes. However, the relation among the steering wheel state quantity, the car speed and the steering wheel control quantity is not limited to the above example; some relationship may be previously stored by the designer in the steering wheel control quantity calculation means 83. Note that the steering wheel control quantity calculation method by the steering wheel control quantity calculation means 83 is not limited to the one which depends on the steering wheel state quantity and the car speed, but it is possible to decide the steering wheel control quantity according to values acquired from a yaw rate detection means (not illustrated) of the car, the acceleration detection means 6b, and the like. The steering wheel control quantity decision means 83 outputs the decided information of the steering wheel control quantity to the steering wheel control quantity addition means 3 as the steering wheel control quantity information. Note that the steering wheel control quantity addition means 3 receives a driving current corresponding to the steering wheel control quantity information from an internal or external buttery (not illustrated) and adds the steering wheel control quantity to the steering wheel 1. As has been discussed, the steering wheel control quantity calculation means 83, in the manual steering mode, decides the steering wheel control quantity based on the travelling state information; the steering wheel control quantity decided at this time is defined as $\tau 0$[Nm]. The steering wheel control quantity $\tau 0$ is a variable that varies according to the travelling state of the car.

On the other hand, in the compulsory automatic steering mode, the steering wheel control quantity calculation means 83 calculates a steering wheel control quantity which is different from the steering wheel control quantity calculated by the steering wheel control quantity calculation method in the manual steering mode and makes the steering wheel control quantity addition means 3 add the calculated quantity. In the present embodiment, the steering wheel control quantity calculation means 83 calculates the steering wheel control quantity $2\tau 0$ which is calculated by doubling the steering wheel control quantity $\tau 0$ calculated in the manual steering mode, and makes the steering wheel control quantity addition means 3 add the steering wheel control quantity to the steering wheel 1. That is, the steering wheel control quantity calculated by the steering wheel control quantity calculation means 83, in the manual steering mode and in the compulsory automatic steering mode, if the cars are in the same travelling state and the same travelling state information is received, calculates the steering wheel control quantity so that the steering wheel control quantity in the compulsory automatic steering mode is twice as large as the steering wheel control quantity in the manual steering mode. With this configuration, when the manual steering mode is switched to the compulsory automatic steering mode, the driver feels the change of the steering wheel control quantity of the steering wheel 1 and is able to recognize, via the steering wheel 1, that the mode is switched to the compulsory automatic steering mode. In the present embodiment, the steering wheel control quantity calculation means 83, in the compulsory automatic steering mode, makes the steering wheel control quantity addition means 3 add the steering wheel control quantity which is made by doubling the steering wheel control quantity $\tau 0$ calculated in the manual steering mode; however, it is also possible to makes add the steering wheel control quantity which is made by halving the steering wheel control quantity $\tau 0$ calculated in the manual steering mode. Also with this configuration, when the manual steering mode is switched to the compulsory automatic steering mode, the driver feels the change of the steering wheel control quantity of the steering wheel 1 and is able to recognize, via the steering wheel 1, that the mode is switched to the compulsory automatic steering mode. Further, in the present embodiment, in the compulsory automatic steering mode, the steering wheel control quantity which is larger or smaller than the steering wheel control quantity $\tau 0$ calculated in the manual steering mode may be added to the steering wheel 1; it is also possible to add the steering wheel control quantity which is extremely small such as $0.01\tau 0$, or to lock the steering wheel, and the like.

The deviation quantity calculation means 84 calculates the existence or absence of deviation and a deviation quantity between the steering wheel state quantity and the travelling direction quantity. Specifically, it has been discussed above, in the manual steering mode, the steering wheel state quantity of the steering wheel 1 corresponds to the travelling direction quantity of the travelling direction control means 4; in the compulsory automatic steering mode, since the travelling direction quantity of the travelling direction control means 4 is decided regardless of the steering wheel operation by the driver, the relation between the steering wheel state quantity and the travelling direction quantity is not like the one illustrated in FIG. 4, and a deviation may be generated between the steering wheel state quantity and the travelling direction quantity. The magnitude of deviation is defined as a deviation quantity. The deviation quantity calculation means 84 calculates the deviation and the deviation quantity between the steering wheel state quantity corresponding to the travelling direction quantity detected by the travelling direction detection means 7 and the steering wheel state quantity acquired by the steering wheel state quantity detection means 2, and determines the existence or absence of the deviation.

For instance, in the manual steering mode, when there is the correspondence relation between the steering wheel state quantity $\theta$ and the travelling direction quantity $\phi$ as illustrated as (a) in FIG. 4, the steering wheel state quantity is $\theta=f_1(\phi)$, and the deviation $\delta$ and the existence d of the deviation may be expressed by $\delta=\theta-f_1(\phi)$, $d=1(|\delta|\geq\epsilon)$, and $d=0(|\delta|<\epsilon)$. Here, $\epsilon$ is a threshold value to determine the existence d of the deviation from the deviation $\delta$. As for the existence d of deviation, 1 means the deviation exists, and 0 means no deviation exists. In addition, the deviation quantity calculation means 84 outputs information of the existence of deviation to the steering mode selection means 81. By this operation, the steering mode selection means 81 acquires information that no deviation exists from the deviation quantity calculation means 84, and switches from the compulsory automatic steering mode to the manual steering mode. Note that the deviation $\delta$ is defined as "$\delta=\theta-f_1(\phi)$" ($\phi$: travelling direction quantity, $\theta$: steering wheel state quantity); however, it may be defined in any way as long as it can express quantitatively a degree of the deviation; the deviation $\delta$ may be defined as, for instance, $\delta=f_1(\phi)-\theta$.

Figure 5:
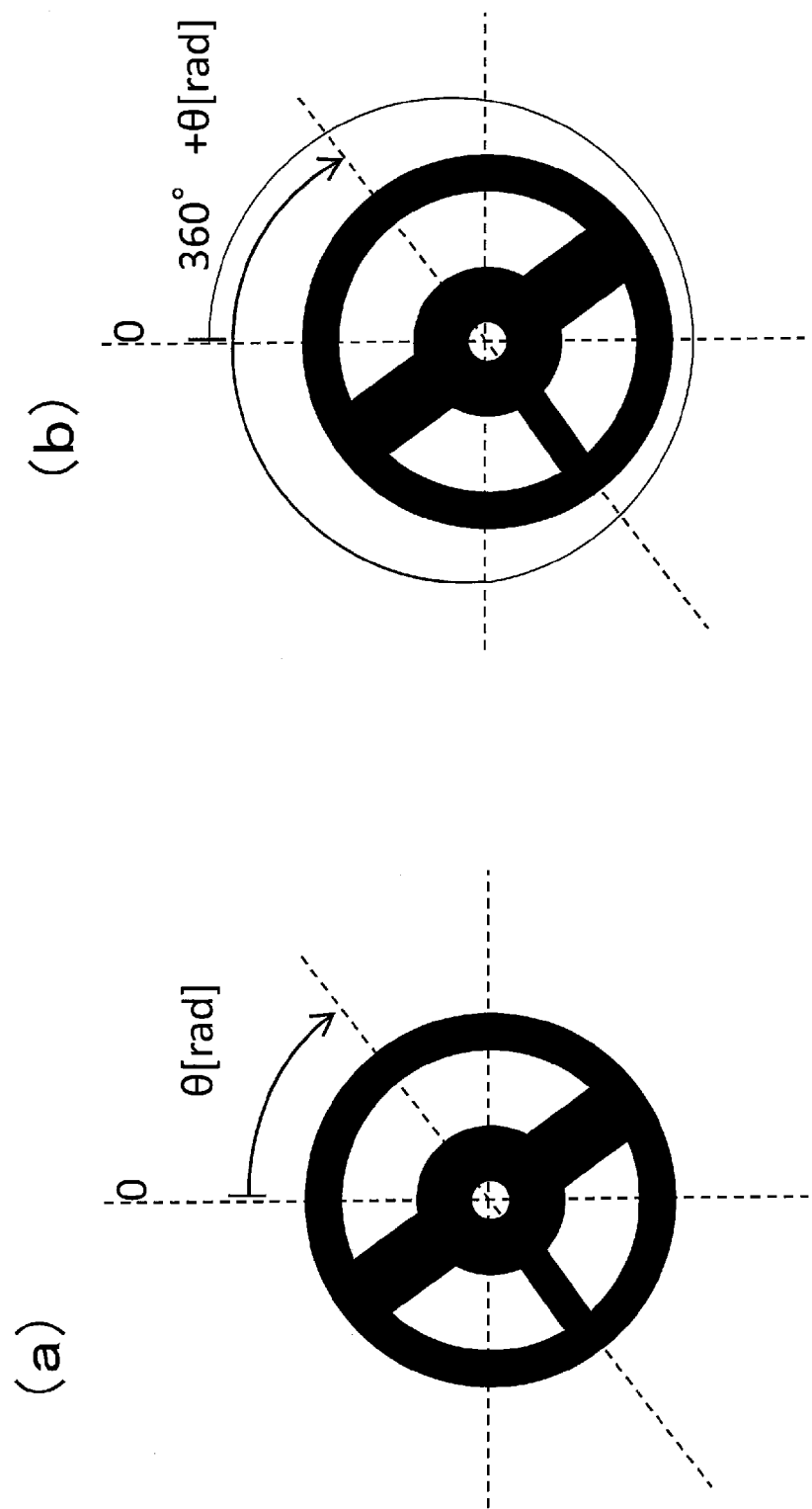
FIG. 5 is a diagram for explaining an operation of steering wheel state quantity reset means.

The steering wheel state quantity reset means 85 is means to reset, in the compulsory automatic steering mode, the steering wheel state quantity of the steering wheel state quantity detection means 2. FIG. 5 is a diagram for explaining the operation of the steering wheel state quantity reset means. For instance, the steering wheel 1 illustrated in FIG. 5 has the same external appearance at each time when the steering wheel state quantity is $2\pi[\text{rad}]$ (360°). In a case where the steering control device 8 related to the present embodiment is used in the car on which the steering wheel 1 is mounted, even if the steering wheel state quantity is different, the external appearance of the steering wheel 1 looks sometimes the same. If the steering wheel state quantity received by the steering control device 8 causes the same external appearance, that is, in an example of (b) in FIG. 5, when the steering wheel rotates by $2\pi[\text{rad}]+\theta$, the external appearance becomes the same as (a) in FIG. 5, the steering wheel state quantity reset means 85 resets the steering wheel state quantity stored in memory means (not illustrated) inside the steering control device 8 to $\theta$. The steering control device 8 calculates the steering wheel control quantity based on the reset steering wheel state quantity. Note that the steering wheel state quantity reset means 85 is also applicable to the steering wheel 1 illustrated as (b) in FIG. 2, and the steering wheel has the same external appearance at every rotation of $\pi/4[\text{rad}]$. In this manner, the reset of the steering wheel state quantity reset means 85 is applicable to the steering wheel 1 which is a rotary steering wheel and has the same external appearance at a specific cycle by rotation. In addition, the steering wheel state quantity reset means 85 is provided inside the steering control device 8, and is to reset the steering wheel state quantity received from the steering wheel state quantity detection means 2; however, the steering wheel state quantity reset means 85 may be provided also inside the steering wheel state quantity detection means 2 to reset the steering wheel state quantity detected by the steering wheel state quantity detection means 2. Note that, in the present embodiment, the reset of the steering wheel state quantity may be applied according to the necessity; it is not always applied.

Figure 6:
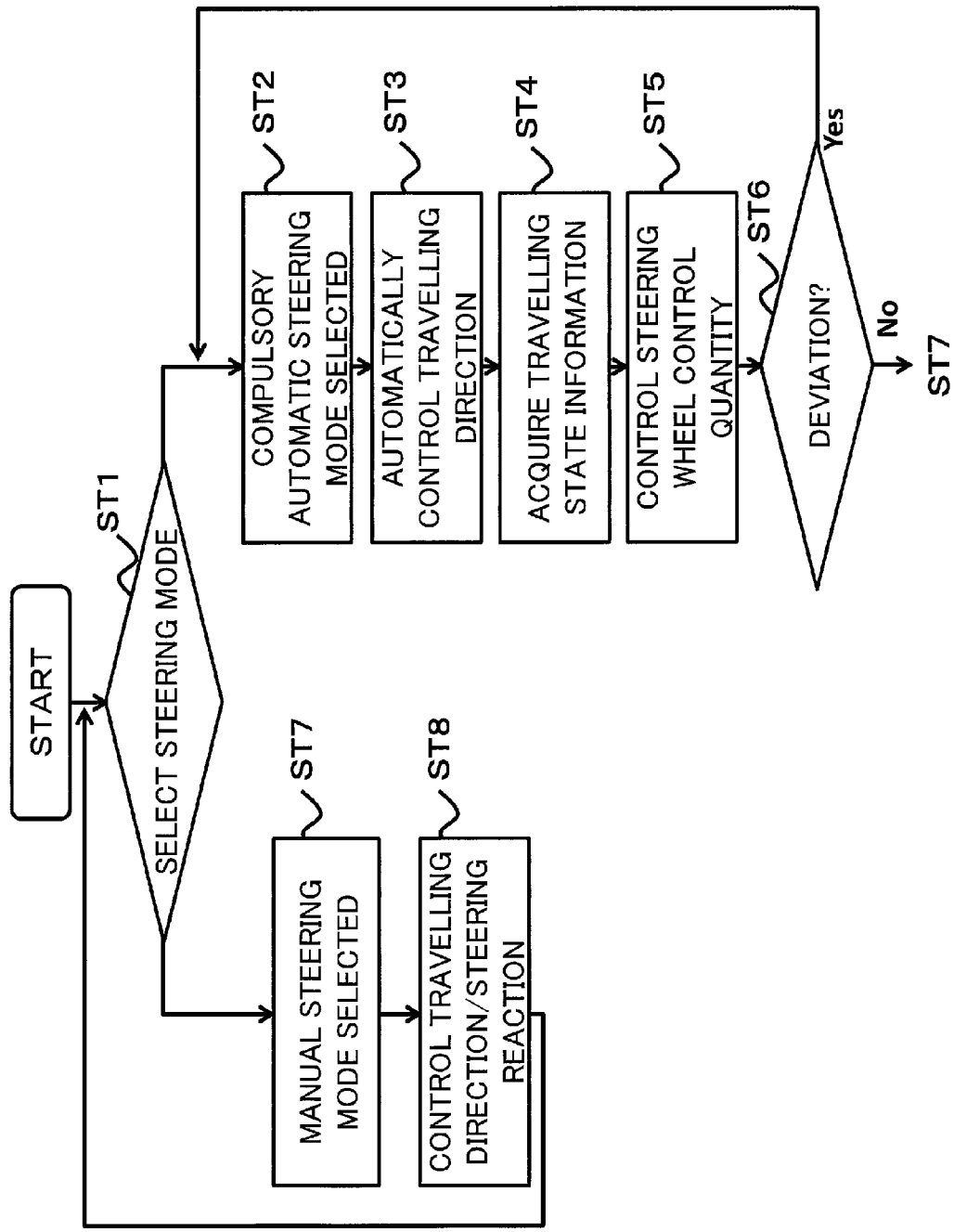
FIG. 6 is an operational flowchart of the steering control system related to the first embodiment.

In the following, with reference to FIG. 6, the operation of the steering control system related to the first embodiment (a procedure of a program related to the first embodiment) will be explained. FIG. 6 is an operational flowchart illustrating the steering control system related to the first embodiment. In the following explanation, an example in which the steering wheel control quantity in the compulsory automatic steering mode is made twice as large as the one in the manual steering control mode is used for explanation.

At ST1, the steering mode selection means 81, at a predetermined time interval, acquires the outside information from the outside information acquisition means 5, information of the car speed from the car speed detection means 6a, and the steering wheel state quantity from the steering wheel state quantity detection means 2, determines whether the obstacle exists within the distance with which the obstacle cannot be avoided by the current car speed and travelling direction quantity. If it is determined that the obstacle cannot be avoided, the steering mode selection means 81 executes the processing of ST2. On the other hand, if it is determined that the obstacle can be avoided, the steering mode selection means 81 executes the processing of ST7.

At ST2, if it is determined that the obstacle cannot be avoided, the steering mode selection means 81 outputs the steering mode information indicating switching to the compulsory automatic steering mode to the travelling direction decision means 82 and the steering wheel control quantity calculation means 83.

At ST3, the travelling direction decision means 82 acquires the steering mode information indicating the compulsory automatic steering mode and automatically controls the travelling direction of the car. Specifically, using the travelling state information indicating the travelling state of the car such as the car speed, the acceleration, the travelling direction quantity, and the like, the travelling direction decision means 82 decides the travelling direction, and outputs as the travelling direction information to the travelling direction control means 4. The travelling direction control means 4, based on the travelling direction information, drives the motor 41 and controls the direction of the wheels 44.

At ST4, while the steering control device 8 automatically controls the travelling direction of the car, the steering wheel control quantity is added to the steering wheel 1. Specifically, acquiring the steering mode information indicating the compulsory automatic steering mode from the steering mode selection means 81, the steering wheel control quantity calculation means 83, using the travelling state information indicating the travelling state of the car such as the car speed, the acceleration, the travelling direction quantity, the steering wheel state quantity, and the like, calculates the steering wheel control quantity $\tau 0$ in the manual steering mode, and further calculates, by doubling this value, the steering wheel control quantity $2\tau 0$. Note that the travelling state information such as the steering wheel control quantity and the like is temporarily stored in memory means (not illustrated) inside the steering control device 8.

At ST5, the steering wheel control quantity calculation means 83 outputs the steering wheel control quantity information indicating the steering wheel control quantity $2\tau 0$ to the steering wheel control quantity addition means 3. The steering wheel control quantity addition means 3 adds the steering wheel control quantity $2\tau 0$ to the steering wheel 1 based on the steering wheel control quantity information.

At ST6, the deviation quantity calculation means 84 calculates the existence or absence of the deviation based on the travelling direction quantity acquired from the travelling direction detection means 7 and the steering wheel state quantity acquired from the steering wheel state quantity detection means 2. If it is determined by the deviation quantity calculation means 84 that the deviation exists, the steering control device 8 returns to the operation of ST2. On the other hand, if it is determined by the deviation quantity calculation means 84 that no deviation exists, the steering control device 8 executes the operation of ST7.

At ST7, the steering mode selection means 81 outputs the steering mode information indicating the manual steering mode to the travelling direction decision means 82 and the steering wheel control quantity calculation means 83.

At ST8, the travelling direction decision means 82 acquires the steering wheel state quantity from the steering wheel state quantity detection means 2 and decides the travelling direction quantity based on the correspondence relation as illustrated in FIG. 4. In addition, the travelling direction decision means 82 outputs the decided travelling direction quantity to the travelling direction control means 4 and makes the travelling direction control means 4 control the travelling direction quantity. On the other hand, the steering wheel control quantity calculation means 83 calculates the steering wheel control quantity $\tau 0$ based on the travelling state information and outputs as the steering wheel control quantity information to the steering wheel control quantity addition means 3. The steering wheel control quantity addition means 3 adds the steering wheel control quantity $\tau 0$ to the steering wheel 1 based on the steering wheel control quantity information. After finishing the above operation, the steering control device 8 returns to ST1 to select the steering mode again.

As has been discussed, the steering control system related to the first embodiment adds, when the mode is switched to compulsory automatic steering mode while the vehicle is running, the steering wheel control quantity having a different magnitude from the steering wheel control quantity to be added in the manual steering mode to the steering wheel 1, and thereby switching to the compulsory automatic steering mode can be recognized by the driver via the steering wheel.

Note that in the explanation of the present embodiment, an example has been discussed in which the steering wheel control quantity calculation means 83 multiplies, in the compulsory automatic steering mode, the steering wheel control quantity $\tau 0$ calculated in the manual steering mode, by 2, ½, 0.01, and the like; the values are not limited to these, that is, the steering wheel control quantity is made different from the one in the manual steering mode as long as it makes the driver recognize that the manual steering mode is switched to the compulsory automatic steering mode. The same is applied to the following embodiment.

In the explanation of the present embodiment, the steering control device 8 switches from the compulsory automatic steering mode to the manual steering mode in a case where the deviation quantity calculation means 84 determines that no deviation exists; however, the switching is not limited to this, the driver may switch from the compulsory automatic steering mode to the manual steering mode by pressing a switch provided inside the car to release the compulsory automatic steering mode, or the steering control device 8 may be configured to switch from the compulsory automatic steering mode to the manual steering mode when a predetermined steering wheel operation is carried out by the driver. In addition, as a condition of switching from the compulsory automatic steering mode to the manual steering mode, in addition to the determination by the deviation quantity calculation means 84 that no deviation exists, another condition can be defined that there is a predetermined distance from the obstacle which has been determined to collide in the future or the obstacle is not recognizable any more. In this example, the steering mode selection means 81 selects the manual steering mode if it is determined based on the stored outside information from the outside information acquisition means 5 that there is a predetermined distance from the obstacle which has been determined to collide in the future or the obstacle is not recognizable any more.

In addition, another case can be considered in which there may be plural steering modes other than the compulsory automatic steering mode. For instance, as a steering mode other than the above, there is an arbitrary automatic steering mode. The arbitrary automatic steering mode is a steering mode in which the position of the object around the car and the state of road surface are detected by the outside information acquisition means 5, the travelling direction quantity which is necessary for taking a course for the destination, while avoiding the object by the car, is calculated, and the steering wheel control quantity to be added to the steering wheel 1 is decided so as to be equal to the steering wheel state quantity which has the correspondence relation with the calculated travelling direction quantity. As for the arbitrary automatic steering mode, for instance, Parking Assist System corresponds to such a mode. In the explanation of the present invention, different from the compulsory automatic steering mode, the arbitrary automatic steering mode can be switched to the manual steering mode by the steering wheel operation of the driver. While the arbitrary automatic steering mode is set, it is possible to switch to the compulsory automatic steering mode which has been explained in the present embodiment. For instance, in a case where the steering mode selection means determines that it is unavoidable to collide with the object without overriding the travelling direction quantity decided by the steering wheel state quantity, it is possible to switch from the arbitrary automatic steering mode to the compulsory automatic steering mode. In addition, when the compulsory automatic steering mode is released, the steering mode may be set to the one which has been selected just before the compulsory automatic steering mode. With this configuration, for instance, in a case where the arbitrary automatic steering mode is switched to the compulsory automatic steering mode, and if the compulsory automatic steering mode is released, it is possible to automatically switch to the arbitrary automatic steering mode which has been selected just before the compulsory automatic steering mode.

Note that, in the present embodiment, the steering wheel control quantity in the manual steering mode is made different from the steering wheel control quantity in the compulsory automatic steering mode; however, as a matter of course, the steering wheel control quantity in the manual steering mode can be the same with the steering wheel control quantity in the compulsory automatic steering mode. Such configuration makes the steering feeling the same in the manual steering mode and in the compulsory automatic steering mode.

Embodiment 2.

The steering control system related to the second embodiment is characterized in that, in the compulsory automatic steering mode, the direction of turning the steering wheel 1 is determined whether to increase or decrease the deviation quantity calculated by the deviation quantity calculation means 84, and the steering wheel control quantity to be added to the steering wheel 1 is decided according to the determination. Hereinafter, the steering control system related to the second embodiment will be explained. Note that, in the following explanation, the same reference numerals are assigned and the explanation will be omitted for the configurational elements being the same as the ones illustrated in FIGS. 1 and 3.

In the present embodiment, the deviation quantity calculation means 84 is an essential configurational element. In FIG. 3, the deviation quantity calculation means 84, in the compulsory automatic steering mode, calculates the deviation quantity at a predetermined time interval. The calculated deviation quantity is output to the steering wheel control quantity calculation means 83.

The steering wheel control quantity calculation means 83, in the compulsory automatic steering mode, calculates the steering wheel control quantity information based on the deviation quantity acquired from the deviation quantity calculation means 84 and the travelling state information. Specifically, the steering wheel control quantity calculation means 83 acquires the steering wheel state quantity and determines whether the direction of turning the steering wheel 1 is to increase or to decrease the deviation quantity. When it is determined the direction of turning the steering wheel 1 is to increase the deviation quantity, the steering wheel control quantity calculation means 83 calculates the steering wheel control quantity $2\tau 0$ by doubling the steering wheel control quantity $\tau 0$ calculated in the manual steering mode, and outputs the information of the steering wheel control quantity $2\tau 0$ to the steering wheel control quantity addition means 3 as the steering wheel control quantity information. The steering wheel control quantity addition means 3 adds the steering wheel control quantity to the steering wheel 1 based on the steering wheel control quantity information.

Figure 7:
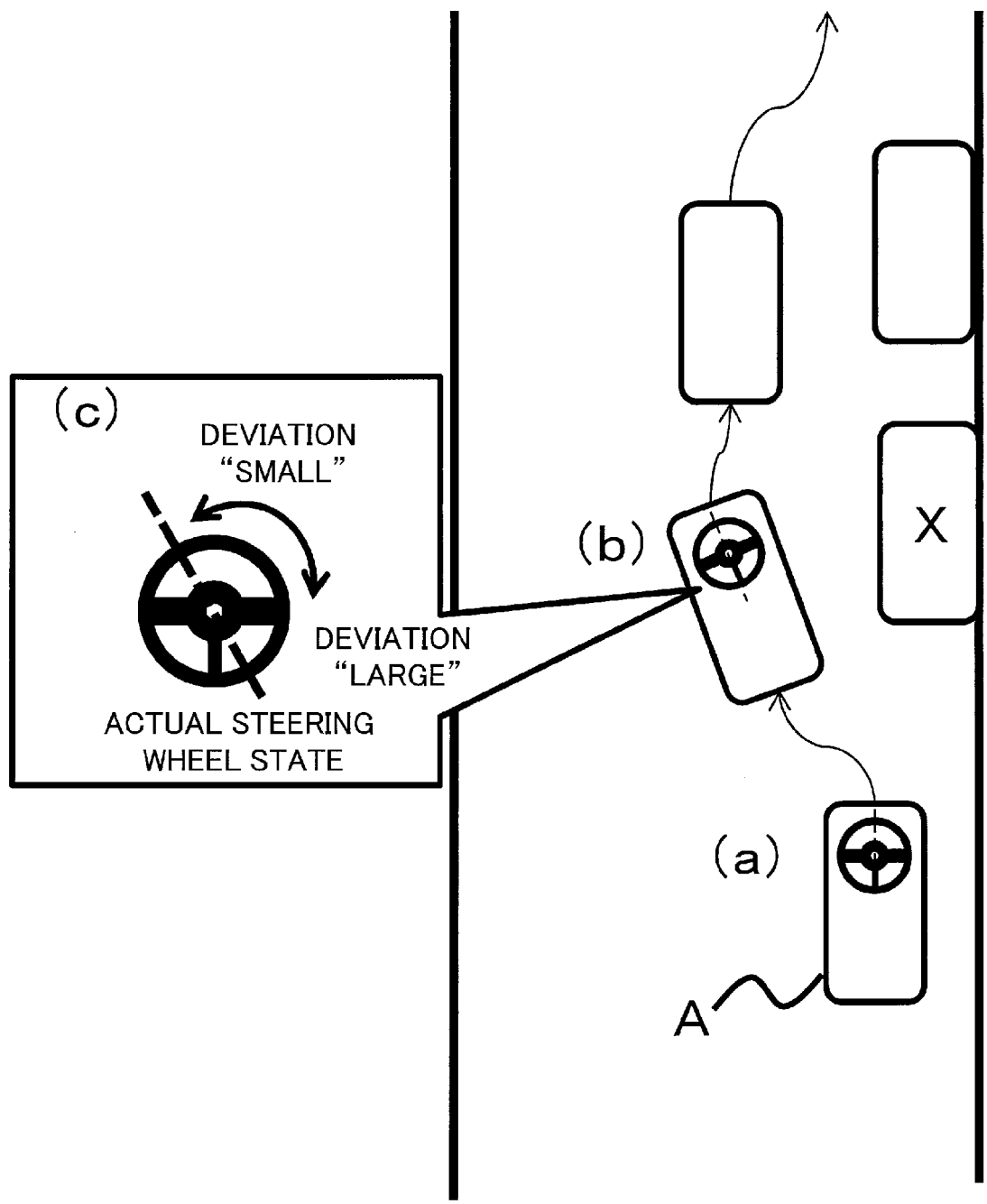
FIG. 7 is a diagram for explaining an operation of a steering control system related to a second embodiment.

FIG. 7 is a diagram for explaining the operation of the steering control system related to the second embodiment. In FIG. 7, (a) and (b) illustrate the states of the steering wheel 1 with respect to the travelling direction of a car A. The car A detects an obstacle X and changes, in the compulsory automatic steering mode, the travelling direction to the direction of (b). At this time, the steering wheel state quantity with respect to the travelling direction quantity of the car in (b) is the direction of the steering wheel 1 indicated by (b). However, actually, since the steering wheel 1 is operated by the driver, the direction of the steering wheel 1 is not always the same with the direction of (b). For instance, when the actual steering wheel state is the direction indicating going straight ahead as illustrated in (c), if the steering wheel 1 is turned from the steering wheel state indicated by (c) to the steering wheel state indicated by (b), the deviation quantity is decreased, and if the steering wheel 1 is turned to the opposite direction, the deviation quantity is increased. In the present embodiment, when the steering wheel 1 is operated by the driver in the direction to leave away from the steering wheel state quantity of the steering wheel 1 indicated by (b) and the deviation quantity is increased, the steering wheel control quantity to be added to the steering wheel 1 is made double.

An example of relation among the deviation $\delta$, the steering wheel state quantity, and the steering wheel control quantity will be discussed in the following. In a case where the steering wheel control quantity addition means 3 is a motor, assuming that the steering wheel control quantity to be added by the steering wheel control quantity addition means 3 in the manual steering mode is $\tau 0$[Nm] and the steering wheel control quantity in the compulsory automatic steering mode is $\tau m$, the relation among the first-order time differential $\theta'$ of the steering wheel state quantity $\theta$, the deviation $\delta$ calculated by the deviation quantity calculation means 84, and the steering wheel control quantity $\tau m$ to be added is: "if $\theta'<0$ and also $\delta<0$, $\tau m=2\tau 0$", "if $\theta'<0$ and also $\delta>0$, $\tau m=\tau 0$", "if $\theta'>0$ and also $\delta<0$, $\tau m=-\tau 0$", and "if $\theta'>0$ and also $\delta>0$, $\tau m=-2\tau 0$". On the other hand, in a case where the steering wheel control quantity addition means 3 is friction means, the relation is: "if $\theta'<0$ and also $\delta<0$, $\tau m=2\tau 0$", "if $\theta'<0$ and also $\delta>0$, $\tau m=\tau 0$", "if $\theta'>0$ and also $\delta<0$, $\tau m=\tau 0$", and "if $\theta'>0$ and also $\delta>0$, $\tau m=2\tau 0$".

Further, the steering wheel control quantity calculation means 83 may be configured to acquire the steering wheel state quantity, and when the steering wheel 1 is turned to the direction to decrease the deviation quantity, to calculate the steering wheel control quantity $\frac{1}{2}\tau 0$ which is a half of the steering wheel control quantity $\tau 0$ calculated in the manual steering mode, and to output the information of the steering wheel control quantity $\frac{1}{2}\tau 0$ to the steering wheel control quantity addition means 3 as the steering wheel control quantity information.

Note that the steering control system related to the present embodiment may be configured to set, only when the steering wheel 1 is operated in the direction to increase the deviation quantity, the steering wheel control quantity in the compulsory automatic steering mode by doubling the steering wheel control quantity τ0 in the manual steering mode; or the system may be configured to set, only when the steering wheel 1 is operated in the direction to decrease the deviation quantity, the steering wheel control quantity in the compulsory automatic steering mode by halving the steering wheel control quantity τ0 in the manual steering mode. Further, it is also possible to apply to both cases in which the deviation quantity increases and decreases.

Further, the steering control system related to the present embodiment decides larger or smaller steering wheel control quantity compared with the steering wheel control quantity in the manual steering mode according to the operation direction of the steering wheel 1; however, in a case where the steering wheel 1 is operated in the direction to increase the deviation quantity in the compulsory automatic steering mode, the system can be configured to add the steering wheel control quantity being larger than a case where the steering wheel 1 is operated in the direction to decrease the deviation quantity of the steering wheel 1. For instance, the system may be configured to add, in the compulsory automatic steering mode, the deviation quantity being a half of the steering wheel control quantity of the case where the steering wheel 1 is operated in the direction to increase the deviation quantity in a case where the steering wheel 1 is operated in the direction to decrease the deviation quantity; and to add the deviation quantity being twice as large as the steering wheel control quantity of the case where the steering wheel 1 is operated in the direction to decrease the deviation quantity, in a case where the steering wheel 1 is operated in the direction to increase the deviation quantity.

In this manner, the steering control system related to the second embodiment, in a case where the steering wheel 1 is operated in the direction to increase the deviation quantity, increases the steering wheel control quantity of the steering wheel 1, and in a case where the steering wheel 1 is operated in the direction to decrease the deviation quantity, decreases the steering wheel control quantity of the steering wheel 1, and thereby the travelling direction controlled in the compulsory automatic steering mode can be known to the driver.

Further, in the compulsory automatic steering mode, the steering wheel control quantity being larger or smaller with respect to the steering wheel control quantity in the manual steering mode is added to the steering wheel 1, and thereby the switching from the manual steering mode to the compulsory automatic steering mode can be recognized by the driver.

Embodiment 3.

Hereinafter, the steering control system related to the third embodiment will be explained. The steering control system related to the third embodiment is provided with a steering detection means (not illustrated) to detect whether or not the driver operates the steering wheel 1 in the compulsory automatic steering mode; and in a case where the driver does not operate the steering wheel 1, the steering control system sets the steering wheel control quantity to be added to the steering wheel 1 to zero, and switches to the manual mode in a state where the steering wheel state quantity corresponds to the travelling direction quantity at the time when the driver finally stops operation of the steering wheel. Note that, in the explanation of the steering control system related to the third embodiment, the same reference numerals are assigned and the explanation will be omitted for the configurational elements being the same as the ones of FIGS. 1 and 3. Note that, in the present embodiment, it is assumed that, in the compulsory automatic steering mode, the compulsory automatic steering mode is not released by the steering wheel operation of the driver.

The steering detection means detects whether or not the steering wheel 1 is operated by the driver. Various configurations can be taken for specific means to determine existence or absence of the steering; for instance, a touch sensor and the like attached to the steering wheel 1 corresponds to such means. The touch sensor detects the steering exists in a case where the driver touches the steering wheel 1, and detects no steering exists in the other cases. In the present embodiment, it is assumed that the steering detection means detects no steering exists.

The steering wheel control quantity calculation means 83 acquires information of the existence or absence of the steering from the steering detection means, and sets the steering wheel control quantity to zero in a case where it is determined no steering exists.

Figure 8:
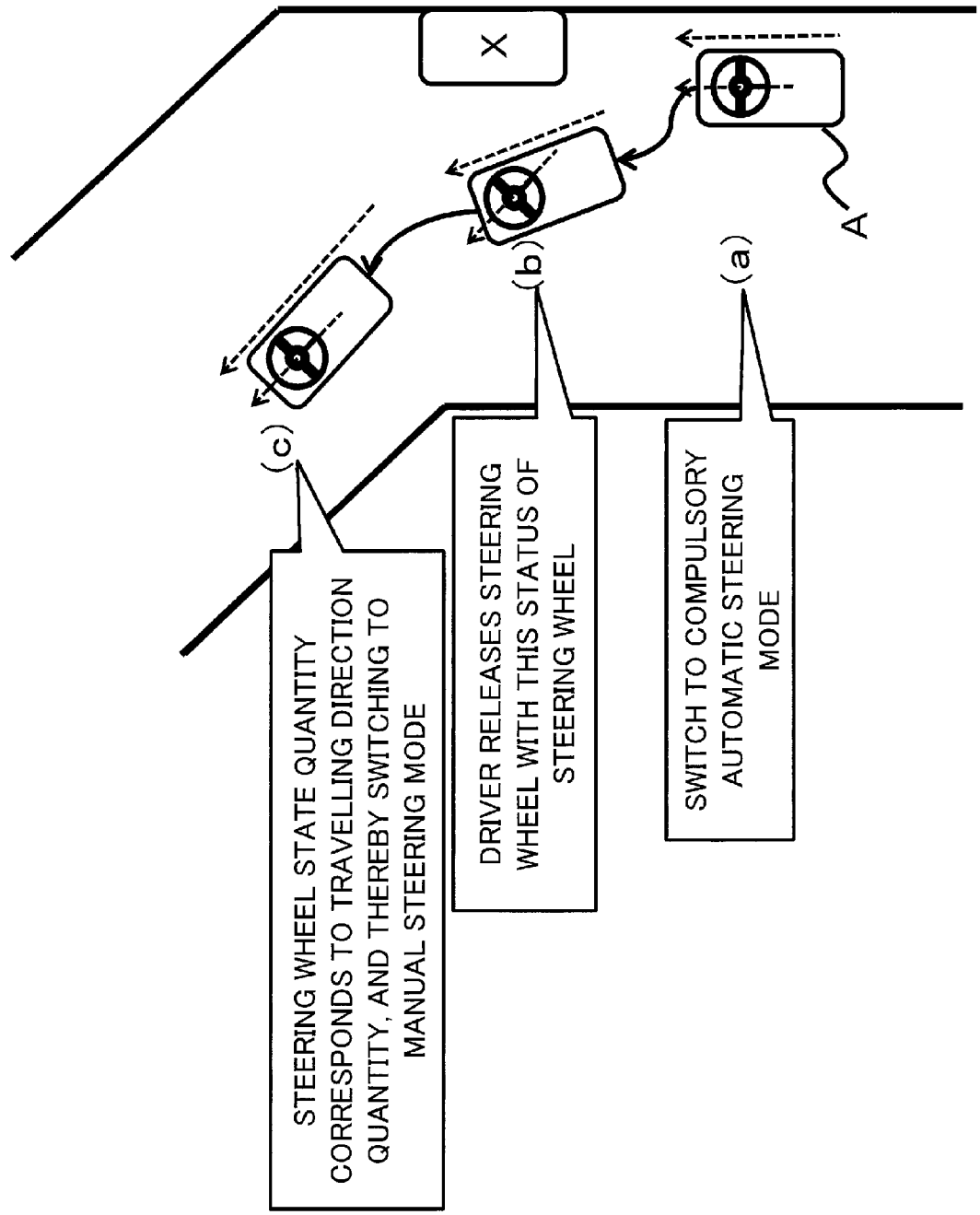
FIG. 8 is a diagram for explaining effect of a steering control system related to a third embodiment.

Subsequently, the effect of the steering control system related to the present embodiment will be explained. FIG. 8 is a diagram for explaining the effect of the steering control system related to the third embodiment. In the explanation of FIG. 8, each steering wheel state (a), (b), or (c) illustrate actual steering wheel states in the compulsory automatic steering mode. As illustrated in FIG. 8, it is assumed that an obstacle X is detected by the steering control system related to the present embodiment, and at the position indicated by (a), a car A is switched to the compulsory automatic steering mode. Subsequently, it is assumed that at the time when the driver, at the position indicated by (b), turns the steering wheel 1 to the left as indicated by (b), the driver recognizes the compulsory automatic steering mode, and he releases the steering wheel 1. Then, the travelling direction of the car is controlled automatically without operating the steering wheel 1 by the driver, and at the first time after the point (b) the steering wheel state quantity corresponds to the travelling direction quantity of the car at the position of (c). At this time, the deviation quantity calculation means 84 outputs information of the existence or absence of the deviation to the steering mode selection means 81. By this operation, the steering mode selection means 81 acquires the information of the absence of the deviation from the deviation quantity calculation means 84 and switches from the compulsory automatic steering mode to the manual steering mode. Accordingly, in a state where the steering wheel state quantity and the travelling direction quantity are made correspond, it is possible to switch to the manual steering mode. Therefore, using the steering control system related to the present embodiment, it is secured to switch to the manual steering mode in a state where the steering wheel state corresponds to the travelling direction at the time when the driver finally stops the steering.

Note that the steering control system related to the third embodiment may be configured to add the steering wheel control quantity in the direction to return the steering wheel 1 to the neutral position in a case where the absence of steering of the steering wheel 1 is detected by the steering detection means. At this time, the steering wheel control quantity to be added in the direction to return to the neutral position may be at least the steering wheel control quantity (hereinafter, referred to as the steering wheel control quantity τ2) which is able to move the steering wheel 1 while the driver does not operate. With this configuration, the steering wheel 1 returns automatically from the steering wheel state at the time when the driver finally stops steering to the steering wheel state indicating going straight ahead, and it is secured to switch to the manual steering mode in a state where the travelling direction of the car is going straight ahead. Note that, in this example, it is assumed that the steering wheel control quantity addition means 3 is means which is able to turn the steering wheel 1 clockwise or counterclockwise such as a motor.

Further, the steering control system related to the third embodiment, when the absence of steering of the steering wheel 1 is detected by the steering detection means, may add the steering wheel control quantity τ2 in the direction to decrease the deviation quantity acquired from the deviation quantity detection means 84, that is, in the direction where the steering wheel control quantity corresponds to the travelling direction quantity as illustrated in FIG. 4 and controls the steering wheel control quantity. With this configuration, in the compulsory automatic steering mode, the steering wheel 1 is turned from the steering wheel state at the time when the driver finally stops steering to the direction corresponding to the travelling direction, and thereby the driver is able to recognize the travelling direction decided in the compulsory automatic steering mode via the steering wheel state. It is also assumed that, in case of this example, the steering wheel control quantity addition means 3 is means which is able to turn the steering wheel 1 clockwise or counterclockwise such as a motor.

Also in the present embodiment, the steering wheel state quantity reset means 85 can be applied. That is, the steering wheel state quantity reset means 85 resets the steering wheel state quantity acquired by the steering control device 8 so as to decrease the deviation quantity. For instance, in a case where the steering wheel 1 illustrated as (a) in FIG. 2 is turned clockwise by 3π/2[rad], and the steering control device 8 controls the steering wheel 1 to the neutral position of the steering wheel 1, the steering wheel state quantity reset means 85 resets the steering wheel state quantity 3π/2[rad] acquired from the steering wheel state quantity detection means 2 to −π/2[rad]. In this manner, the steering wheel state quantity reset means 85 is applied, so that the rotation quantity of the steering wheel 1 to be rotated by the steering wheel control quantity addition means 3 can be decreased. For instance, in a case where the steering wheel 1 illustrated as (a) in FIG. 2 is turned clockwise by 3π/2 [rad], and the steering control device 8 controls the steering wheel 1 to the neutral position of the steering wheel 1, it takes a shorter time to decrease the deviation quantity, since the rotation quantity of the steering wheel 1 is less in the case of turning clockwise by π/2[rad] than the case of returning the steering wheel 1 counterclockwise by 3π/2[rad].

Note that it has been explained the touch sensor is an example of the steering detection means in the present embodiment; however, another configuration is possible so that an emitter and a receiver are attached to the steering wheel 1, and if light emitted by the emitter is not sensed by the receiver, it is determined the steering exists, and in the other cases, no steering exists. Or, the steering detection means may be means to detect the existence of steering of the steering wheel 1 when the driver operates the steering wheel 1 and if the force applied to the steering wheel 1 (driver steering quantity) becomes equal to or greater than a threshold value. Specifically, in a case where the steering wheel 1 is a wheel for steering of rotary type (for instance, (a) to (b) in FIG. 4), if the rotation quantity θ[rad] is the steering wheel state quantity, assuming that the clockwise rotation is positive; the steering wheel control torque τm[Nm] is the steering wheel control quantity, assuming that a vector in the direction which moves away from the driver is an axis and the clockwise turning is positive; and a driver steering torque $\tau_d$[Nm] is the driver steering quantity, assuming that a vector in the direction which moves away from the driver is an axis and the direction of the clockwise turning is positive, the driver steering quantity is calculated as "$\tau_d = I(d^2\theta/dt^2) - \tau m - \tau_f$". Here, I[kgm$^2$] is an inertial moment of a movable part configured by a wheel for steering and a shaft in the steering wheel 1, and $\tau_f$[Nm] is a friction torque generated by the shaft, gears, and the like of the steering wheel. In addition, in a case where the steering wheel 1 is a knob which slides from side to side, if a displacement quantity θ[m] is the steering wheel state quantity, assuming the rightward direction is positive; a steering wheel control force $F_m$[N] is the steering wheel control quantity, assuming that the rightward direction is positive; and the driver steering force $F_d$[N] is the driver steering quantity, assuming that the rightward direction is positive, the driver steering quantity is calculated as "$F_d = m(d^2\theta/dt^2) - F_m - F_f$". Here, m[kg] is mass of a movable part configured by the knob and components connected to the knob in the steering wheel 1, and $F_f$[N] is a friction force generated by the shaft, gears, and the like of the steering wheel. In this manner, the system may be configured to determine that the steering exists, after calculating the driver steering quantity, if the magnitude of the driver steering quantity is equal to or greater than the threshold value; and to determine that no steering exists in the other cases. Note that, although the friction is considered using $\tau_f$ and $F_f$, in a case where the influence of friction is ignorably small, terms of $\tau_f$ and $F_f$ can be omitted in the above equation. In addition, it is also possible to omit the terms of $\tau_f$ and $F_f$ in the above equation by calculating the steering wheel control quantity (τm and $F_m$) including the influence by the friction.

Also in the present embodiment, plural steering modes can be applied. For instance, the system is configured to, in a case where the arbitrary automatic steering mode is switched to the compulsory automatic steering mode, and the deviation quantity detection means 84 detects that no deviation exists, release the compulsory automatic steering mode, and to automatically switch to the arbitrary automatic steering mode which has been selected just before the compulsory automatic steering mode. Since the arbitrary automatic steering mode is switched to the manual steering mode by the steering wheel operation of the driver, an effect is provided, which at an arbitrary timing while the travelling direction of the car corresponds to the steering wheel state quantity, the driver can switch to the manual steering mode. In addition, the system may also be configured to switch, if it is set as an essential condition for switching that the deviation quantity detection means 84 detects no deviation exists in the compulsory automatic steering mode, from the compulsory automatic steering mode to the arbitrary automatic steering mode based on another condition. That is, in the compulsory automatic steering mode, it is possible not to switch to the arbitrary automatic steering mode unless the deviation quantity detection means 84 detects no deviation exists. With this configuration, while securing the safeness, the compulsory automatic steering mode can be switched to the arbitrary automatic steering mode.

As has been discussed, the steering control system related to the third embodiment adds, after the driver stops steering of the steering wheel 1, the steering wheel control quantity of the steering wheel 1 in the direction to set to zero or the neutral position, and in a case where the deviation quantity detection means 84 detects no deviation exists, the compulsory automatic steering mode is switched to the manual steering mode; the mode can be switched to the manual steering mode in a state where the steering wheel state quantity corresponds to the travelling direction quantity, so that it is possible to continue driving without feeling sense of incongruity after the compulsory automatic steering mode is finished.

The steering control system related to the first to third embodiments is configured as discussed above; in the above explanation, the vehicle includes a car, a ship, an airplane, and the like in which the driver controls the direction by the steering wheel 1.

In the steering control system related to the first to third embodiments, the steering wheel state quantity has been expressed as information indicating the operation quantity $\theta$[rad] of the steering wheel 1, assuming that the steering wheel state indicating going straight ahead (the neutral position) is 0 and the clockwise rotation is positive as illustrated as (a) in FIG. 2. However, the steering wheel state quantity can be expressed by a magnitude of the rotation quantity and 1-bit data expressing left or right, assuming that the counterclockwise rotation is positive or the steering wheel state indicating going straight ahead is 0. In addition, not only the rotation quantity of the steering wheel 1, the rotation speed can be also included in the steering wheel state quantity. In this case, a combination of the rotation quantity and the first-grade time differential of the rotation quantity is set as the steering wheel state quantity. In addition, inside the steering wheel 1, a mechanism which converts rotational motion to linear motion (gears, and the like) is provided, and displacement quantity of the linear motion after the conversion may be defined as the steering wheel state quantity.

In the steering control system related to the first to third embodiments, the travelling direction quantity has been explained using an example of the rotation quantity of front wheels, assuming that the front wheel state indicating going straight ahead is 0 and the clockwise rotation is positive; however, the travelling direction quantity may be something at least that indicates the travelling direction of the car, assuming that going straight ahead is 0. For instance, as for a car which has more than two front wheels and requires different control with the rotation quantity in the direction of the front wheel, the travelling direction quantity may be the rotation quantity of a specific front wheel which matches the variation of the car in the travelling direction, or may be other physical quantity such as a yaw rate or a curvature. In addition, for a car which controls the rotation quantity of direction of the rear wheels in addition to the front wheels and the strength of the damper, a yaw rate or a curvature may be used for the travelling direction quantity. As for the travelling direction control means 4, in airplane, an apparatus which controls an output of an engine, an angle of a flap, direction of a rudder, and the like correspond to such means. In this case, for instance, a yaw rate and the like can be used as the travelling direction quantity. In addition, in ships, an apparatus which controls a direction of a screw propeller and a direction of a rudder plate corresponds to such means. Also in this case, a yaw rate and the like can be used as the travelling direction quantity. Other than the yaw rate, the travelling direction quantity can be expressed by a combination of data expressing going straight ahead, clockwise rotation or counterclockwise rotation and a radius of rotation. In this manner, the travelling direction control means 4 can be an arbitrary configuration to control the travelling direction of the car, and the travelling direction quantity can be arbitrary data to express variation of the travelling direction of the car.

The existence or absence d of deviation is determined by "$\delta=\theta-f_1(\phi)$, $d=1(|\delta|\geq\epsilon)$, $d=0(|\delta|<\epsilon)$" using the threshold value $\epsilon$; however, it can be defined in any way as long as it expresses the existence or absence of the deviation such as: a case in which the steering wheel state quantity is represented by a number of a certain quantized value, and if $\theta$ is the same with $f_1(\phi)$, and it is calculated that no deviation exists, and in the other cases, the deviation exists; and further a case in which a data map indicating the existence or absence of the deviation with respect to the combination of $\theta$ and $f_1(\phi)$ is retained previously, and the existence or absence of the deviation can be calculated by referencing to the data map.

REFERENCE SIGNS LIST

1: steering wheel; 2: steering wheel state quantity detection means; 3: steering wheel control quantity addition means; 4: travelling direction control means; 5: outside information acquisition means; 6*a*: car speed detection means, 6*b*: acceleration detection means, 7: travelling direction detection means; 8: steering control device; 41: motor; 42: shaft; 43: arm; and 44: wheel.

The invention claimed is:

1. A steering control device having a manual steering mode in which a travelling direction of a vehicle is controlled by controlling a direction of a wheel in correspondence with a steering wheel state quantity indicating an operation quantity of a steering wheel provided at a vehicle separately from the wheel and a compulsory automatic steering mode in which the travelling direction is controlled by controlling the direction of the wheel regardless of the operation quantity, the steering control device controlling a steering wheel control quantity to be added to the steering wheel in accordance with the manual steering mode or the compulsory automatic steering mode, the steering control device comprising:
steering mode selection means to switch between the manual steering mode and the compulsory automatic steering mode; and
steering wheel control quantity calculation means, in a case where the manual steering mode is selected by the steering mode selection means, to calculate the steering wheel control quantity to be added to the steering wheel based on information indicating travelling state of the vehicle, and in a case where the compulsory automatic steering mode is selected by the steering mode selection means, to calculate the steering wheel control quantity having a magnitude different from the steering wheel control quantity calculated in the manual steering mode based on the information indicating the travelling state.

2. The steering control device of claim 1, further comprising:
deviation quantity calculation means to calculate a deviation quantity between the steering wheel state quantity of the steering wheel and the travelling direction of the vehicle,
wherein the steering wheel control quantity calculation means, in the compulsory automatic steering mode, in a case where the steering wheel is operated in a direction to increase the deviation quantity calculated by the deviation quantity calculation means, calculates the steering wheel control quantity having a magnitude larger than the steering wheel control quantity calculated in the manual steering mode.

3. The steering control device of claim 1, further comprising:
    deviation quantity calculation means to calculate a deviation quantity between the steering wheel state quantity of the steering wheel and the travelling direction of the vehicle,
    wherein the steering wheel control quantity calculation means, in the compulsory automatic steering mode, in a case where the steering wheel is operated in a direction to decrease the deviation quantity calculated by the deviation quantity calculation means, calculates a steering wheel control quantity having a magnitude smaller than the steering wheel control quantity calculated in the manual steering mode.

4. The steering control device of claim 1 further comprising:
    deviation quantity calculation means to calculate a deviation quantity between the steering wheel state quantity of the steering wheel and the travelling direction of the vehicle,
    wherein the steering mode selection means, in the compulsory automatic steering mode, switches to the manual steering mode in a case where it is determined no deviation exists by the deviation quantity calculation means.

5. The steering control device of claim 4 further comprising:
    steering detection means to detect existence or absence of operation of the steering wheel,
    wherein the steering wheel control quantity calculation means, in a case where it is detected that the steering wheel is not operated by the steering detection means, sets 0 to the steering wheel control quantity.

6. The steering control device of claim 4 further comprising:
    steering detection means to detect existence or absence of operation of the steering wheel,
    wherein the steering wheel control quantity calculation means, in a case where it is detected that the steering wheel is not operated by the steering detection means, calculates the steering wheel control quantity to direct to a neutral position of the steering wheel.

7. The steering control device of claim 4 further comprising:
    steering detection means to detect existence or absence of operation of the steering wheel,
    wherein the steering wheel control quantity calculation means, in a case where it is detected that the steering wheel is not operated by the steering detection means, calculates the steering wheel control quantity in a direction to decrease the deviation quantity calculated by the deviation quantity calculation means.

8. The steering control device of claim 6,
    wherein the steering wheel is a rotary steering wheel which has a same external appearance at a specific cycle by rotation,
    the steering control device further comprising:
    steering wheel state quantity reset means to reset the steering wheel state quantity so as to decrease the deviation quantity calculated by the deviation quantity calculation means,
    wherein the steering wheel control quantity calculation means calculates the steering wheel control quantity based on the steering wheel state quantity reset by the steering wheel state quantity reset means.

9. A steering control device having a manual steering mode in which a travelling direction of a vehicle is controlled by controlling a direction of a wheel in correspondence with a steering wheel state quantity indicating an operation quantity of a steering wheel provided at a vehicle separately from the wheel and a compulsory automatic steering mode in which the travelling direction is controlled by controlling the direction of the wheel regardless of the operation quantity, the steering control device controlling a steering wheel control quantity to be added to the steering wheel in accordance with the manual steering mode or the compulsory automatic steering mode,
    the steering control device comprising:
    steering mode selection means to switch between the manual steering mode and the compulsory automatic steering mode;
    deviation quantity calculation means to calculate a deviation quantity between the steering wheel state quantity of the steering wheel and the travelling direction of the vehicle; and
    steering wheel control quantity calculation means, in a case where the compulsory automatic steering mode is selected by the steering mode selection means, calculate, when the steering wheel is operated in a direction to increase the deviation quantity, the steering wheel control quantity having a magnitude larger than a case when the steering wheel is operated in a direction to decrease the deviation quantity.

10. The steering control device of claim 1, further comprising:
    deviation quantity calculation means to calculate a deviation quantity between the steering wheel state quantity of the steering wheel and a travelling direction of the vehicle,
    the steering control device having an arbitrary automatic steering mode in which the travelling direction is controlled regardless of the operation quantity, state of the steering wheel is controlled so as to correspond to the travelling direction, and the arbitrary automatic steering mode is switched to the manual steering mode in a case where the steering wheel is operated,
    wherein the steering mode selection means, in the compulsory automatic steering mode, does not switch to the arbitrary automatic steering mode unless the deviation quantity calculated by the deviation quantity calculation means is determined that no deviation exists.

11. A steering control system having:
    a steering wheel provided at a vehicle separately from a wheel;
    steering control means having a manual steering mode in which a travelling direction of the vehicle is controlled by controlling a direction of the wheel in correspondence with a steering wheel state quantity indicating an operation quantity of the steering wheel and a compulsory automatic steering mode in which the travelling direction is controlled by controlling the direction of the wheel regardless of the operation quantity, to calculate a steering wheel control quantity to be added to the steering wheel according to the manual steering mode or the compulsory automatic steering mode; and
    steering wheel control quantity addition means to add the steering wheel control quantity to the steering wheel based on the steering wheel control quantity calculated by the steering control means,
    wherein the steering control means comprises:
    steering mode selection means to switch between the manual steering mode and the compulsory automatic steering mode;

steering wheel control quantity calculation means, in a case where the manual steering mode is selected by the steering mode selection means, to calculate the steering wheel control quantity to be added to the steering wheel based on information indicating travelling state of the vehicle, in a case where the compulsory automatic steering mode is selected by the steering mode selection means, to calculate the steering wheel control quantity having a magnitude different from the steering wheel control quantity calculated in the manual steering mode based on the information indicating the travelling state.

12. A steering control method comprising:
a steering mode selection step to select one of a manual steering mode in which a travelling direction of a vehicle is controlled by controlling a direction of a wheel in correspondence with a steering wheel state quantity indicating an operation quantity of a steering wheel provided at a vehicle separately from the wheel and a compulsory automatic steering mode in which the travelling direction is controlled by controlling the direction of the wheel regardless of the operation quantity,
a steering wheel control quantity calculating step, in a case where the manual steering mode is selected by the steering mode selection means, to calculate a steering wheel control quantity to be added to the steering wheel based on information indicating travelling state, in a case where the compulsory automatic steering mode is selected by the steering mode selection means, to calculate, the steering wheel control quantity having a magnitude different from the steering wheel control quantity calculated in the manual steering mode based on the information indicating the travelling state; and
a steering wheel control quantity adding step to control steering wheel control quantity addition means to add the steering wheel control quantity to the steering wheel based on the steering wheel control quantity calculated by the steering wheel control quantity calculating step.

13. A computer readable medium storing a steering control program to cause a computer to execute:
a steering mode selection step to select one of a manual steering mode in which a travelling direction of a vehicle is controlled by controlling a direction of a wheel in correspondence with a steering wheel state quantity indicating an operation quantity of a steering wheel provided at a vehicle separately from the wheel and a compulsory automatic steering mode in which the travelling direction is controlled by controlling the direction of the wheel regardless of the operation quantity,
a steering wheel control quantity calculating step, in a case where the manual steering mode is selected by the steering mode selection means, to calculate a steering wheel control quantity to be added to the steering wheel based on information indicating travelling state, in a case where the compulsory automatic steering mode is selected by the steering mode selection means, to calculate, the steering wheel control quantity having a magnitude different from the steering wheel control quantity calculated in the manual steering mode based on the information indicating the travelling state; and
a steering wheel control quantity adding step to control steering wheel control quantity addition means to add the steering wheel control quantity to the steering wheel based on the steering wheel control quantity calculated by the steering wheel control quantity calculating step.

\* \* \* \* \*